US011546173B2

(12) United States Patent
Chen et al.

(10) Patent No.: US 11,546,173 B2
(45) Date of Patent: Jan. 3, 2023

(54) METHODS, APPLICATION SERVER, IOT DEVICE AND MEDIA FOR IMPLEMENTING IOT SERVICES

(71) Applicant: VeChain Global Technology, S.AR.L, Luxembourg (LU)

(72) Inventors: Yanyu Chen, Shanghai (CN); Jianliang Gu, Shanghai (CN); Ziheng Zhou, Shanghai (CN)

(73) Assignee: VeChain Global Technology SARL, Luxembourg (LU)

( * ) Notice: Subject to any disclaimer, the term of this patent is extended or adjusted under 35 U.S.C. 154(b) by 60 days.

(21) Appl. No.: 16/964,778

(22) PCT Filed: Jan. 28, 2019

(86) PCT No.: PCT/CN2019/073518
§ 371 (c)(1),
(2) Date: Jul. 24, 2020

(87) PCT Pub. No.: WO2019/144963
PCT Pub. Date: Aug. 1, 2019

(65) Prior Publication Data
US 2021/0058258 A1 Feb. 25, 2021

(30) Foreign Application Priority Data
Jan. 26, 2018 (CN) .......................... 201810078175.2

(51) Int. Cl.
*H04L 9/32* (2006.01)
*G16Y 30/10* (2020.01)
(Continued)

(52) U.S. Cl.
CPC ............ *H04L 9/3252* (2013.01); *G16Y 30/10* (2020.01); *H04L 9/0618* (2013.01);
(Continued)

(58) Field of Classification Search
None
See application file for complete search history.

(56) References Cited

U.S. PATENT DOCUMENTS

| 9,635,021 | B2 | 4/2017 | Smith |
| 9,716,595 | B1 | 7/2017 | Kravitz et al. |

(Continued)

FOREIGN PATENT DOCUMENTS

| CN | 102694804 A | 9/2012 |
| CN | 103442353 A | 12/2013 |

(Continued)

OTHER PUBLICATIONS

PCT International Search Report and Written Opinion dated Apr. 18, 2019 in International Application No. PCT/CN2019/073518.
(Continued)

*Primary Examiner* — Bassam A Noaman
(74) *Attorney, Agent, or Firm* — Downs Rachlin Martin PLLC

(57) ABSTRACT

A method is disclosed for implementing trust Internet of Things (IoT) services in an IoT device and a user device. The IoT device receives from the user device an authentication request comprising a hash value, first encrypted information and second encrypted information, where the IoT device determines whether the user device is successfully authenticated based on determining the user device public key and confirming that the user device public key exists in a list of access permitted user devices of the IoT device.

12 Claims, 6 Drawing Sheets

(51) Int. Cl.
  *H04L 9/06* (2006.01)
  *H04L 9/08* (2006.01)
  *H04L 9/40* (2022.01)
  *H04L 9/00* (2022.01)
(52) U.S. Cl.
  CPC ........ *H04L 9/0825* (2013.01); *H04L 63/0876* (2013.01); *H04L 9/50* (2022.05)

(56) References Cited

U.S. PATENT DOCUMENTS

| | | | |
|---|---|---|---|
| 9,967,334 | B2 | 5/2018 | Ford |
| 2007/0113073 | A1* | 5/2007 | Maillard ................ H04N 5/913 380/255 |
| 2015/0180840 | A1* | 6/2015 | Jung ........................ G06F 8/65 713/150 |
| 2016/0275461 | A1 | 9/2016 | Sprague et al. |
| 2016/0306966 | A1* | 10/2016 | Srivastava .............. G06F 21/53 |
| 2017/0046792 | A1 | 2/2017 | Haldenby et al. |
| 2017/0064554 | A1* | 3/2017 | Li ............................ H04L 9/088 |
| 2017/0171178 | A1 | 6/2017 | Reynders |
| 2017/0171180 | A1 | 6/2017 | Britt et al. |
| 2017/0214522 | A1* | 7/2017 | Code ...................... H04L 9/0891 |
| 2017/0302663 | A1 | 10/2017 | Nainar et al. |
| 2018/0060596 | A1* | 3/2018 | Hamel .................... H04L 9/3236 |
| 2018/0183587 | A1 | 6/2018 | Won et al. |
| 2018/0295133 | A1 | 10/2018 | Xu |
| 2019/0020629 | A1 | 1/2019 | Baird, III et al. |
| 2019/0052466 | A1* | 2/2019 | Bettger ................. H04L 9/0643 |
| 2019/0089532 | A1* | 3/2019 | Lambert ............... H04L 9/3273 |
| 2019/0123910 | A1* | 4/2019 | Riley .................... H04L 9/0897 |

FOREIGN PATENT DOCUMENTS

| | | |
|---|---|---|
| CN | 106130779 A | 11/2016 |
| CN | 106301794 A | 1/2017 |
| CN | 106603586 A1 | 4/2017 |
| CN | 107103252 A | 8/2017 |
| CN | 107391974 A | 11/2017 |
| CN | 107426250 A | 12/2017 |
| CN | 107528856 A | 12/2017 |
| CN | 107533501 A | 1/2018 |
| KR | 101678795 B1 | 11/2016 |
| WO | 2017063524 A1 | 4/2017 |
| WO | 2017127564 A1 | 7/2017 |
| WO | 2017165828 A1 | 9/2017 |
| WO | 2017187397 A1 | 11/2017 |
| WO | 2018126029 A2 | 7/2018 |

OTHER PUBLICATIONS

Ayoade, Gbadebo et al., "Decentralized IoT Data Management Using BlockChain and Trusted Execution Environment." IEEE International Conference on Information Reuse and Integration (IRE) 2018 (last viewed on Jan. 18, 2019).

* cited by examiner

METHODS, APPLICATION SERVER, IOT DEVICE AND MEDIA FOR IMPLEMENTING IOT SERVICES

FIELD

The present disclosure generally relates to the field of Internet of Things (IoT), and more particularly, to methods, an application server, an IoT device, a user device, and computer readable storage media for implementing trust IoT services based on a block chain.

BACKGROUND

At present, with developments of IoT technologies, more and more IoT devices are put into use. These IoT devices are usually provided by different device providers and use different product specifications. Identifier formats, physical connection manners or communication protocols, and data formats of these IoT devices may not be uniform, making it difficult to interconnect the IoT devices from different providers.

In order to manage these IoT devices, each device provider needs to provide a centralized control center to manage corresponding IoT devices provided by the device provider. Such dispersive control centers require relatively high construction costs.

On the other hand, with more and more IoT devices being interconnected, the accompanying security issues are increasingly prominent. For example, in July 2015, Fiat Chrysler U.S. announced to recall 1.4 million cars equipped with Uconnect on-board systems because hackers can use remote software to send commands to the on-board systems to perform various operations such as slowing down, turning off the engine, and disabling the brake, etc., which would seriously affect safety of vehicle drivers and passengers.

In addition, in case that the IoT devices provided by respective device providers are independently managed by respective control centers, the control centers have absolute control over the data of the IoT devices such that when the IoT devices provided by different providers interact, it may not ensure the obtained data having not been tampered with.

SUMMARY

In view of at least one of the above problems, embodiments of the present disclosure provide methods, an application server, an IoT device, a user device, and computer readable storage media for implementing trust IoT services.

According to a first aspect of the present disclosure, there is provided an application server for implementing trust IoT services based on a block chain. The application server includes a memory and a processor, the memory being stored with machine executable instructions that, when executed by the processor, cause the application server to perform operations including: determining a uniform device identifier specification for a plurality of IoT devices, wherein the plurality of IoT devices are provided by at least one provider; determining a unique identifier for each IoT device of the plurality of IoT devices, the unique identifier conforming to the uniform device identifier specification and the unique identifier being a public key in a pair of public key and private key of the IoT device; and registering the unique identifier of the IoT device with a block chain platform.

According to a second aspect of the present disclosure, there is provided a method for implementing trust IoT services based on a block chain. The method includes determining a uniform device identifier specification for a plurality of IoT devices, wherein the plurality of IoT devices are provided by at least one provider; determining a unique identifier for each IoT device of the plurality of IoT devices, the unique identifier conforming to the uniform device identifier specification and the unique identifier being a public key in a pair of public key and private key of the IoT device; and registering the unique identifier of the IoT device with a block chain platform.

According to a third aspect of the present disclosure, there is provided a nonvolatile computer readable storage medium for implementing trust IoT services based on a block chain. The storage medium includes machine executable instructions that, when executed by a machine, are adapted to cause the machine to implement the method as described in the above second aspect.

According to a fourth aspect of the present disclosure, there is provided an IoT device for implementing trust IoT services based on a block chain, the IoT device being configured with a pair of IoT device public key and IoT device private key. The IoT device includes a memory and a processor, the memory being stored with machine executable instructions that, when executed by the processor, cause the IoT device to perform operations including: receiving an authentication request from a user device, the user device being configured with a pair of user public key and user private key, and the authentication request including a hash value of user data of the user device, first encrypted information obtained based on the IoT device public key and a user random number and second encrypted information obtained based on the user private key, the user random number and the hash value; authenticating, based on the IoT device private key and the authentication request, the user device to obtain the user public key; determining whether the user public key exists in a list of access permitted user devices of the IoT device; and in response to determining that the user public key exists in the list of access permitted user devices of the IoT device, determining that authentication of the user device succeeds.

According to a fifth aspect of the present disclosure, there is provided a method for implementing trust IoT services based on a block chain, the method being performed by an IoT device configured with a pair of IoT device public key and IoT device private key. The method includes receiving an authentication request from a user device, the user device being configured with a pair of user public key and user private key, and the authentication request including a hash value of user data of the user device, first encrypted information obtained based on the IoT device public key and a user random number and second encrypted information obtained based on the user private key, the user random number and the hash value; authenticating, based on the IoT device private key and the authentication request, the user device, to obtain the user public key; determining whether the user public key exists in a list of access permitted user devices of the IoT device; and in response to determining that the user public key exists in the list of access permitted user devices of the IoT device, determining that authentication of the user device succeeds.

According to a sixth aspect of the present disclosure, there is provided a nonvolatile computer readable storage medium for implementing trusted IoT services based on a block chain. The storage medium includes machine executable instructions that, when executed by a machine, are adapted to cause the machine to implement the method as described in the above fifth aspect.

According to a seventh aspect of the present disclosure, there is provided a user device for implementing trust IoT services based on a block chain, the user device being configured with a pair of user public key and user private key. The user device includes a memory and a processor, the memory being stored with machine executable instructions that, when executed by the processor, cause the user device to perform operations including: performing a hash operation on user data of the user device to generate a hash value of the user data; obtaining, based on the IoT device public key of the IoT device and a user random number, first encrypted information; obtaining, based on the user private key, the user random number and the hash value, second encrypted information; and sending an authentication request to the IoT device, the authentication request including the hash value of the user data, the first encrypted information, and the second encrypted information.

According to an eighth aspect of the present disclosure, there is provided a method for implementing trust IoT services based on a block chain, the method being performed by a user device configured with a pair of user public key and user private key. The method includes performing a hash operation on user data of the user device to generate a hash value of the user data; obtaining, based on an IoT device public key of an IoT device and a user random number, first encrypted information; obtaining, based on the user private key, the user random number, and the hash value, second encrypted information; and sending an authentication request to the IoT device, the authentication request including the hash value of the user data, the first encrypted information, and the second encrypted information.

According to a ninth aspect of the present disclosure, there is provided a nonvolatile computer readable storage medium for implementing trust IoT services based on a block chain. The storage medium includes machine executable instructions that, when executed by a machine, are adapted to cause the machine to implement the method as described in the above eighth aspect.

BRIEF DESCRIPTION OF THE DRAWINGS

The present disclosure will be understood better and other objectives, details, features, and advantages of the present disclosure will become more apparent from the description of specific embodiments of the disclosure given in conjunction with the following figures, wherein.

DETAILED DESCRIPTION OF THE PREFERRED EMBODIMENTS

Embodiments of the present disclosure will now be described in more details in conjunction with accompanying figures. Although embodiments of the present disclosure are shown in the accompanying figures, it should be understood that the present disclosure can be embodied in various ways but not be limited to the embodiments described herein. Instead, the embodiments are provided herein to make the disclosure more thorough and complete and convey the scope of the present disclosure to those skilled in the art.

Figure 1:
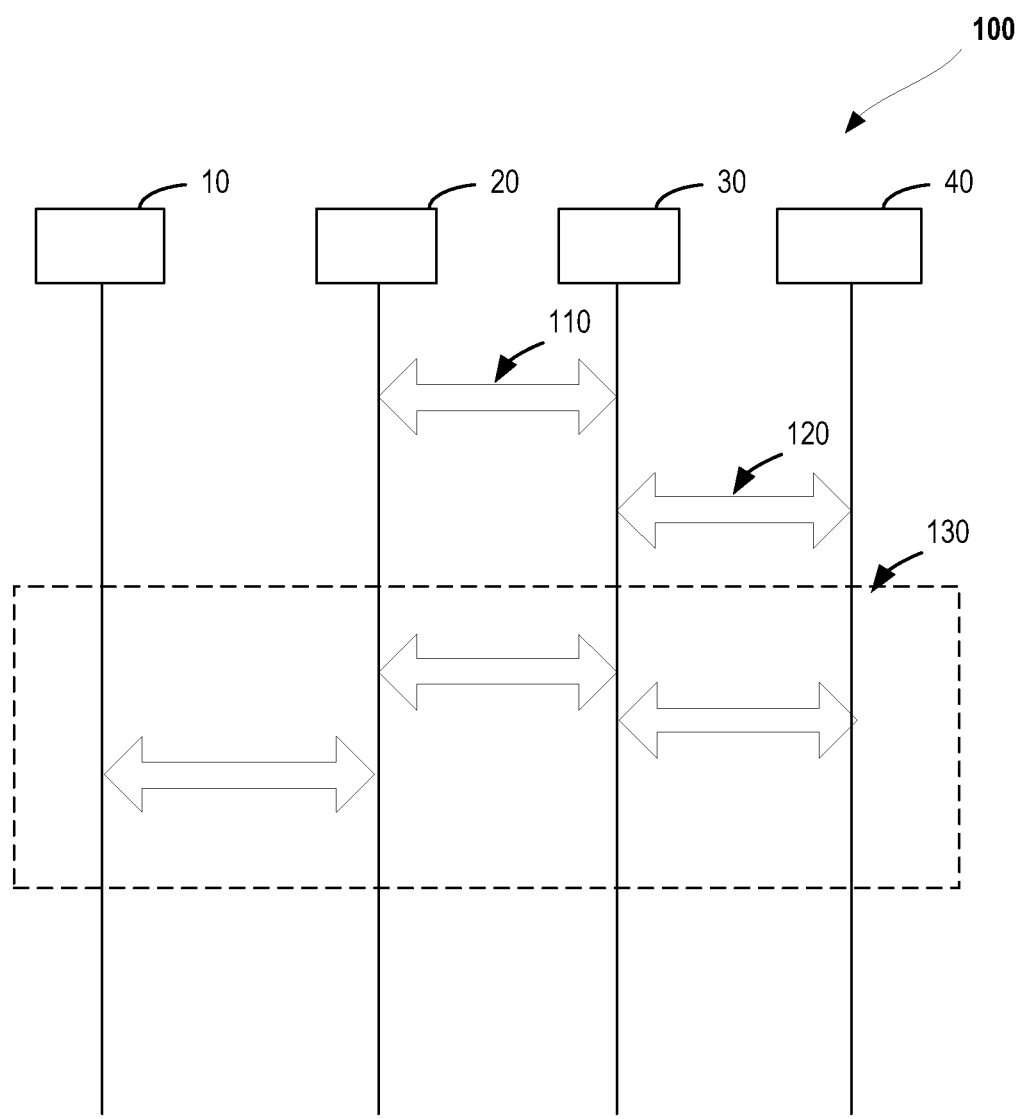
FIG. 1 illustrates a schematic diagram of a system for implementing trust IoT services based on a block chain according to embodiments of the present disclosure.

FIG. 1 illustrates a schematic diagram of a system 100 for implementing trust IoT services based on a block chain according to embodiments of the present disclosure. As shown in FIG. 1, the system 100 includes a block chain platform 10, an application server 20, one or more IoT devices 30 (only one is exemplarily shown in the figure), and at least one user device 40 (only one is exemplarily shown in the figure). Herein, a device that will access the IoT device 30 to obtain data is referred to as the user device 40. However, this is merely for the sake of clarity of description. In fact, the user device 40 may be another IoT device that implements, with the IoT devices 30, the interconnection between different IoT devices. Therefore, the description herein regarding the IoT device 30 may also be applicable to the user device 40. A plurality of IoT devices 30 are provided by at least one device provider and thus they use different communication protocols and/or data formats. The application server 20 is used to provide the plurality of IoT devices 30 in the system 100 with a uniform device identifier specification and data format, so as to enable interconnections between the IoT devices 30 provided by different providers.

In order to implement the trust IoT services, there are various problems to be addressed, such as establishment of identities of the IoT devices (the process 110 as shown in FIG. 1), identification of the identities between the IoT devices (the process 120 as shown in FIG. 1), and interconnections between the IoT devices (the process 130 as shown in FIG. 1), and so on. Structures and operations of the application server 20, the IoT device 30, and the user device 40 will be described below with reference to FIGS. 2 to 5.

Figure 2:
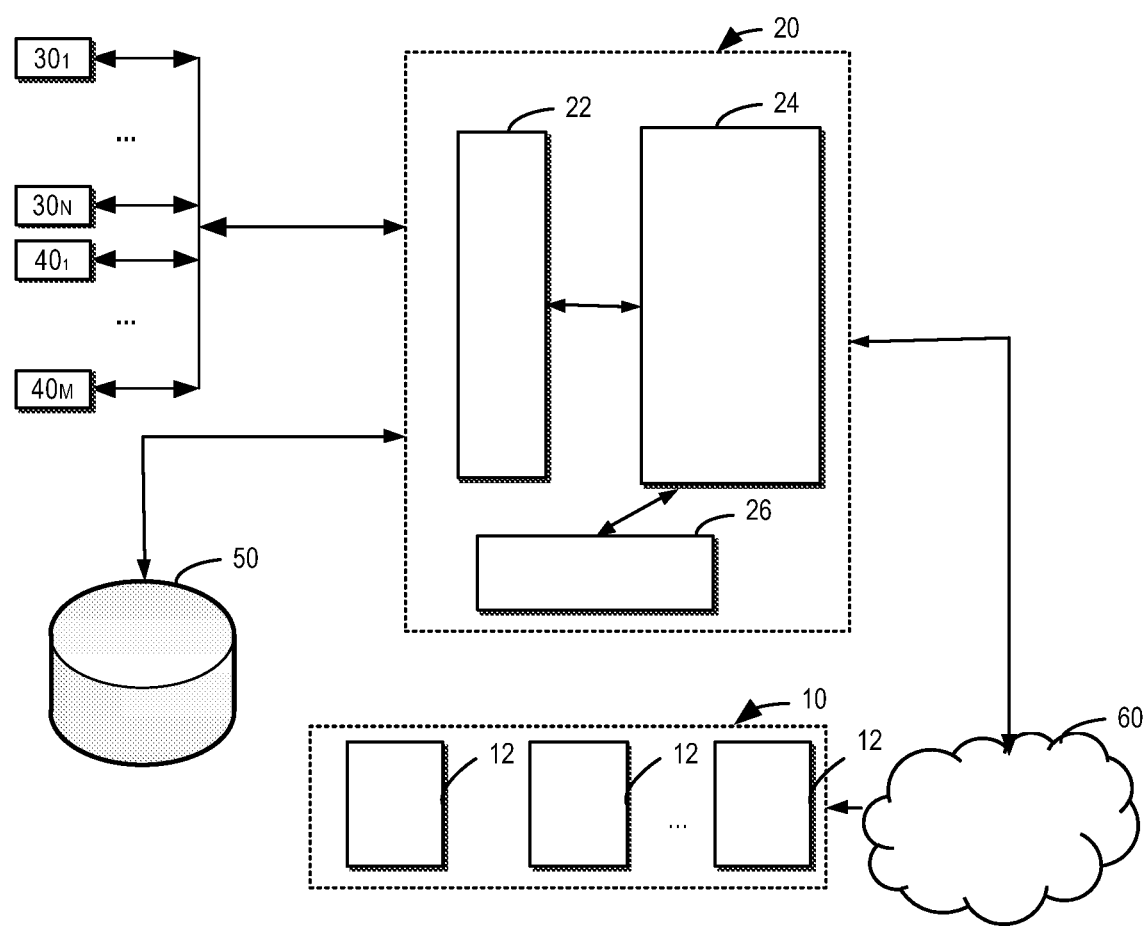
FIG. 2 illustrates a block diagram of an application server for implementing trust IoT services based on a block chain according to embodiments of the present disclosure.

FIG. 2 illustrates a block diagram of an application server 20 for implementing trust IoT services based on a block chain according to embodiments of the present disclosure. As shown in FIG. 2, the application server 20 comprises a transceiver 22, a processor 24, and a memory 26. In some embodiments, the memory 26 is stored with computer program codes, which, when executed by the processor 24, perform the method 300 described below in conjunction with FIG. 3. The processor 24 is configured to interact with the plurality of IoT devices $30_1, \ldots 30_N$ (collectively referred to herein as the IoT device 30) in a wired or wireless manner through the transceiver 22. In addition, the processor 24 is also configured to interact with the at least one user device $40_1, \ldots 40_M$ (collectively referred to herein as the user device 40) in a wired or wireless manner through the transceiver 22. As described above in connection with FIG. 1, the user device 40 may be a conventional user terminal or another IoT device.

The application server 20 may communicate with each block chain node 12 of the block chain platform 10 via a wired or wireless network 60, for example, via a block chain application interface (not shown in the figure).

In addition, the application server 20 may also be coupled to a distributed database 50. The distributed database 50 may be part of the application server 20, or may be distributed among multiple network nodes independently of the application server 20.

Figure 3:
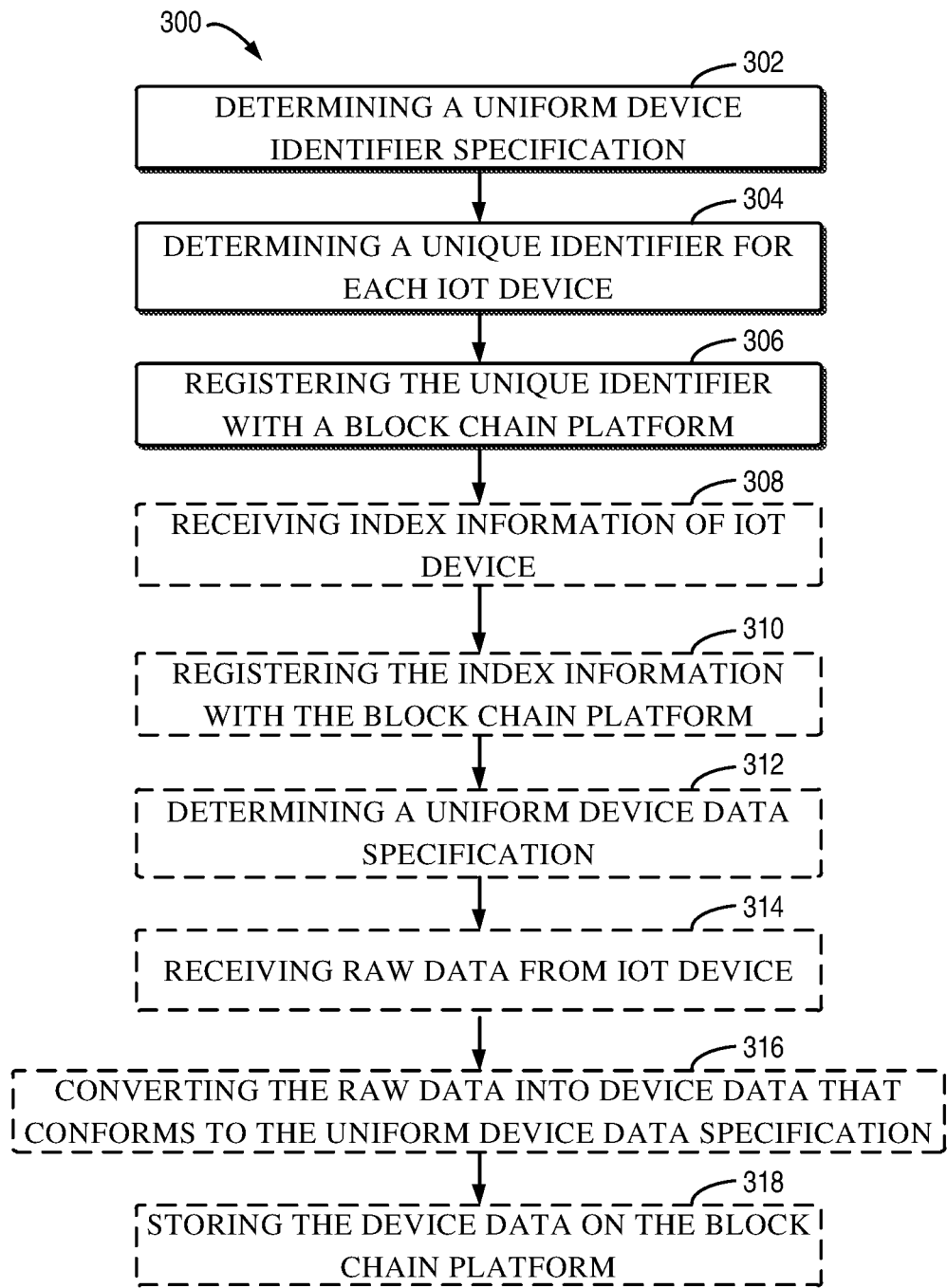
FIG. 3 illustrates a flow chart of a method for implementing trust IoT services based on a block chain implemented in an application server according to embodiments of the present disclosure.

FIG. 3 illustrates a flow chart of a method 300 for implementing trust IoT services based on a block chain implemented in an application server according to embodiments of the present disclosure. The application server may be, for example, the application server 20 shown in FIG. 2.

At block 302, the application server 20 determines a uniform device identifier specification for the plurality of IoT devices 30. Here, the uniform device identifier specification may be defined by the operator of the application server 20, or may be defined by a higher level organization such as a trust IoT alliance or the like.

At block 304, the application server 20 determines a unique identifier for each of the plurality of IoT devices 30, and the unique identifier should conform to the uniform device identifier specification. The unique identifier is a public key in a pair of public key and private key of the IoT device 30.

There may be a variety of different implementations of block 304 depending on the entity that generates the unique identifier.

In some embodiments, the application server 20 generates a pair of public key and private key for each of the plurality of IoT devices 30. The public key conforms to the uniform device identifier specification. The application server 20 sends the public key and the private key to the IoT device 30 so as to store the private key in the IoT device 30 in an unreadable manner and use the public key as the unique identifier of the IoT device 30. In these embodiments, in order to ensure that the private key of the IoT device 30 exists only within the IoT device 30 itself, the application server 20 should destroy the generated private key after sending it to the IoT device 30.

In some other embodiments, the unique identifier is generated by each IoT device 30 itself. In this case, the application server 20 signals the plurality of IoT devices 30 of the uniform device identifier specification, and receives from each of the plurality of IoT devices 30 a unique identifier that conforms to this uniform device identifier specification generated by the IoT device 30. According to embodiments of the present disclosure, the IoT device 30 generates a pair of public key and private key according to the uniform device identifier specification, and sends the public key to the application server 20 as the unique identifier of the IoT device 30 and stores the private key in the IoT device 30 in an unreadable manner (e.g., in the unreadable memory 36 of the IoT device 30 shown below in connection with FIG. 4).

In addition, in still other embodiments, the unique identifier may also be generated by the provider of the IoT device 30 before or after the delivery of the IoT device 30. In this case, the application server 20 signals the uniform device identifier specification to at least one provider of the IoT devices 30, and receives, from the at least one provider, unique identifiers generated by the provider for corresponding IoT devices of the plurality of IoT devices 30. The unique identifiers conform to the uniform device identifier specification. According to embodiments of the present disclosure, the provider of the IoT device 30 generates a pair of public key and private key for the IoT device 30, and sends the public key to the application server 20 as the unique identifier of the IoT device 30 and sends the private key to the IoT device 30 to store in the IoT device 30 in an unreadable manner (e.g., in the unreadable memory 36 of the IoT device 30 shown below in connection with FIG. 4).

Returning to the method 300, after the unique identifier of each IoT device 30 is determined, the application server 20 registers the unique identifier with the block chain platform 10 at block 306.

Through blocks 302 to 306 of the method 300 described above, the device identifiers of the IoT devices 30 provided by various different providers are uniform so that each IoT device 30 may be identified uniformly and uniquely in the system 100 across multiple IoT device providers.

In some application scenarios, it is still difficult to locate the IoT device 30 only through the unique identifier of the IoT device 30. To address this, the method 300 may further include a block 308, where the application server 20 may further receive index information of the IoT device 30 from the IoT device 30, and a block 310, where the application server 20 registers the index information with the block chain platform 10. The index information of the IoT device 30 is used in combination with the unique identifier of the IoT device 30 to locate the IoT device 30. For example, the index information of the IoT device 30 may include the location of the IoT device 30. In this case, the index information may be regarded as guidance information for a user to find the corresponding IoT device 30.

Here, the index information of the IoT device 30 may be requested by an explicit signaling from the application server 20, or may be sent by the application server 20 to the IoT device 30 together with the uniform device identifier specification, or may be predefined by the system 100.

In addition, in order to achieve interconnection between the IoT devices 30 from different providers, a uniform data format or protocol should also be provided for the communication of respective IoT devices 30. To this end, the method 300 may further include a block 312, where the application server 20 provides a uniform device data specification for the plurality of IoT devices 30. Here, the uniform device data specification may be defined by the operator of the application server 20, or may be defined by a higher level organization such as the trust IoT alliance or the like.

At block 314, the application server 20 receives raw data from the IoT device 30. The raw data is in a format specific to the provider of the IoT device 30. At block 316, the application server 20 converts the raw data to device data that conforms to the uniform device data specification. At block 318, the application server 20 stores the device data on the block chain platform 10.

Depending on the application scenarios, the blocks 314 to 318 may have different implementations.

In some embodiments, the raw data includes raw history data and the device data includes device history data. In this case, at block 314, the application server 20, for example, periodically receives raw history data from the IoT device 30, converts the raw history data into device history data (block 316), and stores the device history data on the block chain platform 10 (block 318).

In this case, when the user device 40 requests the application server 20 for the device history data of the IoT device 30, the application server 20 obtains the requested device history data from the block chain platform 10 after having authenticated the user device 40, for example, as described below with reference to FIGS. 4 to 5. Then, the application server 20 directly transmits the device history data to the user device 40 (not shown in the figure).

In some other embodiments, the raw data includes raw real-time data and the device data includes device real-time data. In this case, for example, in response to a request for real-time data of the IoT device 30 from the user device 40, the application server 20 requests the IoT device 30 for the raw real-time data of the IoT device 30. Next, at block 314, the application server 20 receives the raw real-time data from the IoT device 30, converts the raw real-time data to the device real-time data (block 316), and stores the device real-time data on the block chain platform 10 (block 318).

In this case, the application server 20 directly transmits the device real-time data to the user device 40 after converting the raw real-time data into the device real-time data (block 316).

Since it will occupy a relatively large storage space if storing the device data converted by the application server 20 directly on the block chain platform 10, in an implementation, at block 318, the application server 20 may send the hash value of the device data and the device data per se to a distributed database (such as the database 50 shown in FIG. 2) for storage, and send the hash value of the device data and the unique identifier of the IoT device 30 to the block chain platform 10 for storage. In this way, storage costs can be reduced with secure storage.

Through the above blocks 312 to 318 of the method 300, the data formats or protocols of the IoT devices 30 provided by various different providers are made uniform so that the IoT devices 30 provided by different providers are able to exchange data with each other.

In the above description of the method 300, the conversion of the raw data to the device data is described as being performed centrally by the application server 20 at block 316. However, those skilled in the art may understand that the present disclosure is not limited to this and it is also possible that the raw data of respective IoT devices 30 is converted and sent, by respective providers, to the application server 20 for storage on the block chain platform 10. In this case, the application server 20 should signal the uniform device data specification to the providers of respective IoT devices 30.

Figure 4:
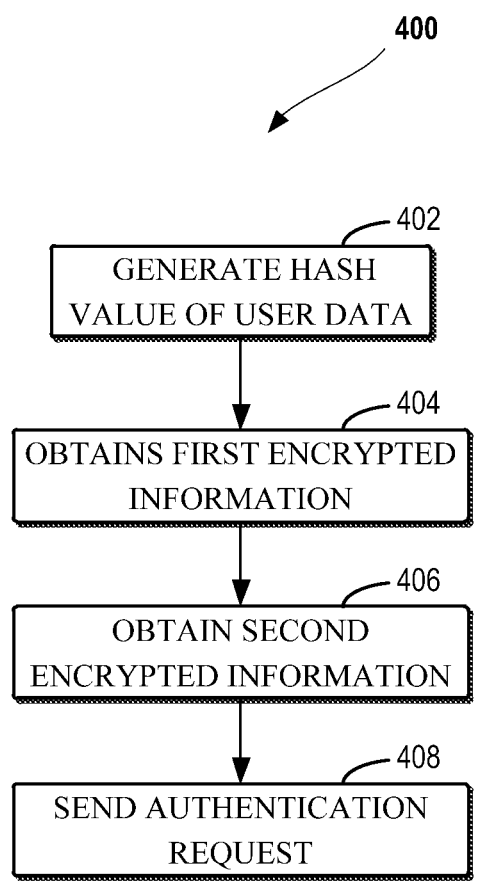
FIG. 4 illustrates a flow chart of a method for implementing trust IoT services based on a block chain implemented in a user device according to embodiments of the present disclosure.

FIG. 4 illustrates a flow chart of a method 400 for implementing trust IoT services based on a block chain implemented in a user device according to embodiments of the present disclosure. The user device may be, for example, the user device 40 as shown in FIG. 1. When the user device 40 wants to access the IoT device 30, the method 400 as shown in FIG. 4 is initiated. It is assumed that the IoT device 30 is configured with a pair of IoT device public key ($P_{IoT}$) and IoT device private key ($K_{IoT}$) and that the user device 40 is configured with a pair of user public key ($P_u$) and user private key ($K_u$). At block 402, the user device 40 performs a hash operation on the user data to generate a hash value H of the user data. Here, the user data may include a description of the accessed contents that the user device 40 wants to get from the IoT device 30.

At block 404, the user device 40 obtains first encrypted information based on the IoT device public key $P_{IoT}$ of the IoT device 30 to be accessed and a user random number $R_u$. For example, the user device 40 may encrypt the user random number $R_u$ using the IoT device public key $P_{IoT}$ to generate the first encrypted information $P_{IoT}(R_u)$.

Next, at block 406, the user device 40 obtains second encrypted information based on the user private key $K_u$, the user random number $R_u$ and the hash value H of the user data. For example, the user device 40 may encrypt the hash value H using the user private key $K_u$ to generate a user signature $K_u(H)$ of the user device 40, and encrypt the user signature $K_u(H)$ using the user random number $R_u$ to generate the second encrypted information $R_u(K_u(H))$.

At block 408, the user device 40 sends an authentication request to the IoT device 30, the authentication request including the hash value H of the user data generated at block 402, the first encrypted information generated at block 404 and the second encrypted information generated at block 406.

With the method 400, during the identity authentication process, the user device 40 may perform multiple encryptions on the user data. The access request sent from the user device 40 to the IoT device 30 does not include any plaintext information, thus improved security may be provided.

Figure 5:
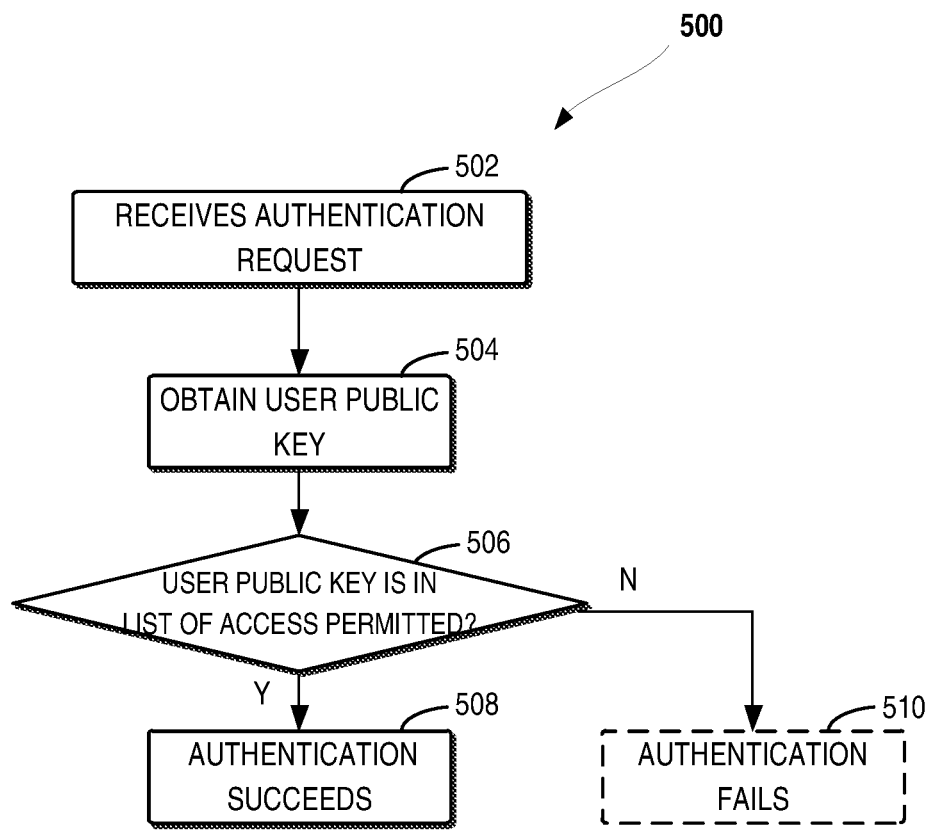
FIG. 5 illustrates a flow chart of a method for implementing trust IoT services based on a block chain implemented in an IoT device according to embodiments of the present disclosure.

FIG. 5 illustrates a flow chart of a method 500 for implementing trust IoT services based on a block chain implemented in the IoT device according to embodiments of the present disclosure. The IoT device may be, for example, the IoT device 30 as shown in FIG. 1.

At block 502, the IoT device 30 receives, from the user device 40, an authentication request. The authentication request includes the hash value H of the user data, the first encrypted information, and the second encrypted information as described above.

At block 504, the IoT device 30 authenticates the user device 40 based on the IoT device private key $K_{IoT}$ and the authentication request to obtain the user public key $P_u$.

In some embodiments, the IoT device 30 calculates the user random number $R_u$ based on the IoT device private key $K_{IoT}$ and the first encrypted information; then calculates the user signature $K_u(H)$ of the user device 40 based on the user random number $R_u$ and the second encrypted information, where the user signature $K_u(H)$ is obtained by encrypting the hash value H using the user private key $K_u$; and then determines the user public key $P_u$ based on the user signature $K_u(H)$ and the hash value H using the elliptic curve cryptography.

For example, the user random number $R_u$ may be calculated according to the following equation (1):

$$R_u = K^{-1}_{IoT}(P_{IoT}(R_u)), \qquad (1)$$

where $P_{IoT}(R_u)$ represents the first encrypted information, and $K^{-1}_{IoT}$ represents the decryption operation using the IoT device private key $K_{IoT}$.

For example, the user signature may be calculated according to the following equation (2):

$$K_u(H) = R^{-1}_u(R_u(K_u(H))), \qquad (2)$$

where $K_u(H)$ represents the user signature, H represents the hash value of the user data, $R_u(K_u(H))$ represents the second encrypted information, and $K^{-1}_u$ represents the decryption operation using the user random number $R_u$.

After obtaining the user public key $P_u$ at block 504, the IoT device 30 determines at block 506 whether the user public key $P_u$ is in the list of access permitted user devices for the IoT device 30. Here, similar to the IoT device 30, the public key $P_u$ of the user device 40 is used as the unique identifier of the user device.

The block 506 may be implemented in different manners depending on the creator of the list of access permitted user devices for the IoT device 30.

In some embodiments, the list is created by the provider of the IoT device 30. For example, the list lists a list of IoT devices permitted by the provider. In this case, at block 506, the IoT device 30 may send the user public key $P_u$ obtained at block 504 to its provider. The provider searches for the user public key $P_u$ in the list of access permitted user devices saved by the provider and returns a search result to the IoT device 30.

In some other embodiments, the list is created by the owner of the IoT device 30. For example, the list lists the list of IoT devices permitted by the owner, which may also be referred to as a local list. In this case, at block 506, the IoT device 30 may directly determine whether the user public key $P_u$ of the user device 40 exists in the list of access permitted user devices saved by the IoT device 30.

At block 508, in response to determining at block 506 that the user public key $P_u$ exists in the list of access permitted user devices of the IoT device 30, the authentication of the user device 40 succeeds. On the other hand, the method 500 may further include a block 510, where in response to determining at block 506 that the user public key $P_u$ does not exist in the list of access permitted user devices of the IoT device 30, the authentication of the user device 40 fails.

With the method 500, it is possible to achieve identity authentication between the IoT device and the user device or between different IoT devices. Also, since during the authentication process, the access request received by the IoT device 30 from the user device 40 does not contain any plaintext information, and thus improved security may be provided.

Those skilled in the art can understand that the methods 400 and 500 can be performed separately or in combination with the method 300 described in connection with FIG. 3.

Figure 6:
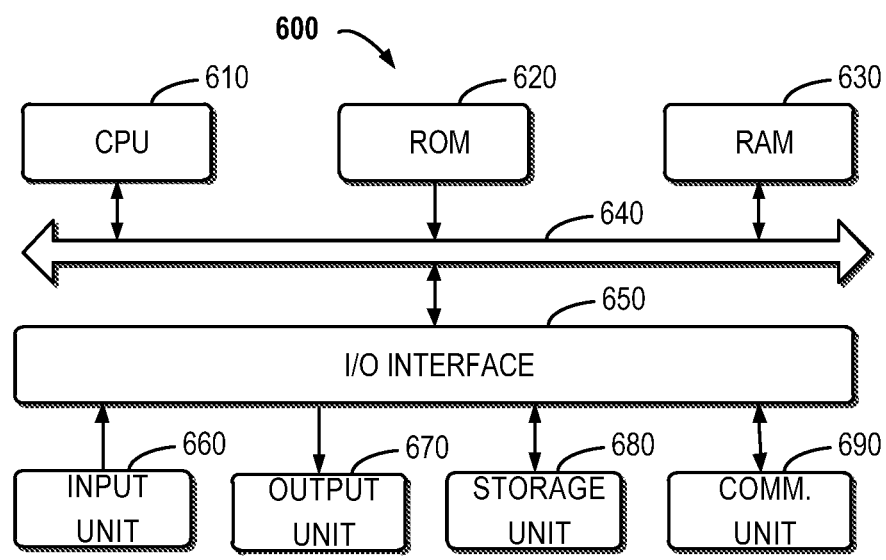
FIG. 6 illustrates a schematic block diagram of an example device for implementing embodiments of the present disclosure.

FIG. 6 illustrates a schematic block diagram of an example device 600 for implementing embodiments of the present disclosure. As shown, the device 600 includes a central processing unit (CPU) 610, which may perform suitable actions or processes according to computer program instructions stored in a read-only memory (ROM) 620 or loaded from a storage unit 680 into a random access memory (RAM) 630. In the RAM 630, various programs and data required for the operation of the device 600 may also be stored. The CPU 610, the ROM 620, and the RAM 630 are connected to one another via a bus 640. An input/output (I/O) interface 650 is also connected to the bus 640.

A plurality of components in the device 600 are connected to the I/O interface 650, including: an input unit 660 such as a keyboard, a mouse, and the like; an output unit 670 such as various types of displays, speakers, and the like; a storage unit 680 such as a magnetic disk, an optical disk, and the like; and a communication unit 690 such as a network card, a modem, a wireless communication transceiver, and the like. The communication unit 690 enables the device 600 to exchange information/data with other devices over computer networks such as the Internet and/or various telecommunication networks.

The various processes and processing described above, such as the methods 300, 400, and 500, may be performed by the processing unit 610. For example, in some embodiments, the methods 300, 400, and 500 may be implemented as a computer software program tangibly embodied in a machine-readable medium such as the storage unit 680. In some embodiments, some or all of the computer program may be loaded into and/or installed onto the device 600 via the ROM 620 and/or the communication unit 690. When the computer program is loaded into the RAM 630 and executed by the CPU 610, one or more actions of the methods 300, 400, and 500 described above may be performed.

The device 600 may be implemented as any of the application server 20, the IoT device 30 and the user device 40 as described herein in connection with FIGS. 1-5. In particular, when the device 600 is used to implement the IoT device 30, it should further include an unreadable memory (not shown in the figure). The IoT device 30 may be configured with a pair of public key and private key, and the public key is stored in a readable memory (such as the ROM 620) and the private key is stored in the unreadable memory. In this way, it is ensured that only the IoT device 30 itself can use the private key, and other entities can only obtain the public key of the IoT device 30 from the readable memory so that the user device 40 or other IoT devices 30 can utilize the public key to authenticate the identity of the IoT device 30.

In one or more exemplary designs, the functions described by the embodiments of the present disclosure may be implemented in hardware, software, firmware, or any combination thereof. If implemented in software, the functions may be stored on or transmitted over as one or more instructions or codes on a computer-readable medium.

The various units of the device described herein may be implemented with discrete hardware components or integrally in a single hardware component such as a processor. For example, the various illustrative logical blocks, modules, and circuits described in connection with the present disclosure may be implemented within or performed by a general purpose processor, a digital signal processor (DSP), an application specific integrated circuit (ASIC), a field programmable gate array (FPGA), or other programmable logic device, a discrete gate or transistor logic, discrete hardware components, or any combination thereof designed to perform the functions described herein.

Those skilled in the art would further appreciate that any of the various illustrative logical blocks, modules, processors, means, circuits, and algorithm steps described in connection with the embodiments of the present disclosure herein may be implemented as electronic hardware, computer software, or combination thereof.

The previous description of the embodiments of the present disclosure is provided to enable any person skilled in the art to make or use the present disclosure. Various modifications to the embodiments of the present disclosure will be readily apparent to those skilled in the art, and the generic principles defined herein may be applied to other aspects without departing from the spirit and scope of the present disclosure. Thus, the present disclosure is not intended to be limited to the examples and designs shown herein but is to be accorded the widest scope consistent with the principles and novel features disclosed herein.

The embodiments of the present disclosure include but are not limited to a series of embodiments expressed in the following numbered paragraphs.

1. An application server for implementing trust Internet of Things (IoT) services based on a block chain, comprising:

a memory and a processor, the memory being stored with machine executable instructions that, when executed by the processor, cause the application server to perform operations including:

determining a uniform device identifier specification for a plurality of IoT devices, wherein the plurality of IoT devices are provided by at least one provider;

determining a unique identifier for each IoT device of the plurality of IoT devices, the unique identifier conforming to the uniform device identifier specification and the unique identifier being a public key in a pair of public key and private key of the IoT device; and registering the unique identifier of the IoT device with a block chain platform.

2. The application server of paragraph 1, wherein determining a unique identifier for each IoT device of the plurality of IoT devices comprises:

sending the uniform device identifier specification to the plurality of IoT devices; and receiving, from each IoT device of the plurality of IoT devices, the unique identifier generated by the IoT device that conforms to the uniform device identifier specification, wherein the private key of the IoT device is generated by the IoT device and is merely stored in the IoT device in an unreadable manner.

3. The application server of paragraph 1, wherein determining a unique identifier for each IoT device of the plurality of IoT devices comprises:

sending the uniform device identifier specification to the at least one provider; and receiving, from the at least one provider, the unique identifier generated by the provider for a corresponding IoT device of the plurality of IoT devices that conforms to the uniform device identifier specification, wherein the private key of the IoT device is generated by the provider and is merely stored in the IoT device in an unreadable manner.

4. The application server of paragraph 1, wherein determining a unique identifier for each IoT device of the plurality of IoT devices comprises:

generating the public key and the private key for each IoT device of the plurality of IoT devices, wherein the public key conforms to the uniform device identifier specification;

sending the public key and the private key to the IoT device to store the private key in the IoT device in an unreadable manner and taking the public key as the unique identifier of the IoT device; and destroying the generated private key of the IoT device.

5. The application server of paragraph 1, wherein the operations further include:

receiving, from each IoT device of the plurality of IoT devices, index information of the IoT device; and registering the index information of the IoT device with the block chain platform.

6. The application server of paragraph 5, wherein the index information includes a location of the IoT device.

7. The application server of paragraph 1, wherein the operations further include:

determining a uniform device data specification for the plurality of IoT devices;

receiving raw data from each IoT device of the plurality of IoT devices, the raw data being in a format specific to a provider of the IoT device;

converting the raw data into device data that conforms to the uniform device data specification; and storing the device data on the block chain platform.

8. The application server of paragraph 7, wherein the raw data includes raw history data and the device data includes device history data, and wherein the operations further include:

in response to a request from a user device for the device history data of the IoT device, obtaining, from the block chain platform, the device history data; and sending the device history data to the user device.

9. The application server of paragraph 7, wherein the raw data includes raw real-time data and the device data includes device real-time data, and wherein the operations further include:

receiving a request from a user device for the real-time data of the IoT device before receiving the raw data from the IoT device;

requesting the IoT device for the raw real-time data of the IoT device; and sending the device real-time data to the user device after converting the raw real-time data into the device real-time data that conforms to the uniform device data specification.

10. A method for implementing trust Internet of Things (IoT) services based on a block chain, comprising:

determining a uniform device identifier specification for a plurality of IoT devices, wherein the plurality of IoT devices are provided by at least one provider;

determining a unique identifier for each IoT device of the plurality of IoT devices, the unique identifier conforming to the uniform device identifier specification and the unique identifier being a public key in a pair of public key and private key of the IoT device; and registering the unique identifier of the IoT device with a block chain platform.

11. The method of paragraph 10, wherein determining a unique identifier for each IoT device of the plurality of IoT devices comprises:

sending the uniform device identifier specification to the plurality of IoT devices; and receiving, from each IoT device of the plurality of IoT devices, the unique identifier generated by the IoT device that conforms to the uniform device identifier specification, wherein the private key of the IoT device is generated by the IoT device and is merely stored in the IoT device in an unreadable manner.

12. The method of paragraph 10, wherein determining a unique identifier for each IoT device of the plurality of IoT devices comprises:

sending the uniform device identifier specification to the at least one provider; and receiving, from the at least one provider, the unique identifier generated by the provider for a corresponding IoT device of the plurality of IoT devices that conforms to the uniform device identifier specification, wherein the private key of the IoT device is generated by the provider and is merely stored in the IoT device in an unreadable manner.

13. The method of paragraph 10, wherein determining a unique identifier for each IoT device of the plurality of IoT devices comprises:

generating the public key and the private key for each IoT device of the plurality of IoT devices, wherein the public key conforms to the uniform device identifier specification;

sending the public key and the private key to the IoT device to store the private key in the IoT device in an unreadable manner and use the public key as the unique identifier of the IoT device; and destroying the generated private key of the IoT device.

14. The method of paragraph 10, further comprising:

receiving, from each IoT device of the plurality of IoT devices, index information of the IoT device; and registering the index information of the IoT device with the block chain platform.

15. The method of paragraph 14, wherein the index information includes a location of the IoT device.

16. The method of paragraph 10, further comprising:

determining a uniform device data specification for the plurality of IoT devices;

receiving raw data from each IoT device of the plurality of IoT devices, the raw data being in a format specific to a provider of the IoT device;

converting the raw data into device data that conforms to the uniform device data specification; and storing the device data on the block chain platform.

17. The method of paragraph 16, wherein the raw data includes raw history data and the device data includes device history data, and wherein the method further comprises:

in response to a request from a user device for the device history data of the IoT device, obtaining, from the block chain platform, the device history data; and sending the device history data to the user device.

18. The method of paragraph 16, wherein the raw data includes raw real-time data and the device data includes device real-time data, and wherein the method further comprises:

receiving a request from a user device for the real-time data of the IoT device before receiving the raw data from the IoT device;

requesting the IoT device for the raw real-time data of the IoT device; and sending the device real-time data to the user device after converting the raw real-time data into the device real-time data that conforms to the uniform device data specification.

19. A nonvolatile computer readable storage medium for implementing trust Internet of Things (IoT) services based on a block chain, comprising machine executable instructions that, when executed by a machine, are adapted to cause the machine to implement the method as any of paragraphs 10-18.

20. An Internet of Things (IoT) device for implementing trust IoT services based on a block chain, the IoT device being configured with a pair of IoT device public key ($P_{IoT}$) and IoT device private key ($K_{IoT}$), the IoT device comprising:

a memory and a processor, the memory being stored with machine executable instructions that, when executed by the processor, cause the IoT device to perform operations including:

receiving an authentication request from a user device, the user device being configured with a pair of user public key ($P_u$) and user private key ($K_u$), and the authentication request including a hash value of user data of the user device, first encrypted information obtained based on the IoT device public key ($P_{IoT}$) and a user random number ($R_u$) and second encrypted information obtained based on the user private key ($K_u$), the user random number ($R_u$) and the hash value;

authenticating, based on the IoT device private key ($K_{IoT}$) and the authentication request, the user device to obtain the user public key ($P_u$);

determining whether the user public key ($P_u$) exists in a list of access permitted user devices of the IoT device; and in response to determining that the user public key ($P_u$) exists in the list of access permitted user devices of the IoT device, determining that authentication of the user device succeeds.

21. The IoT device according to paragraph 20, wherein authenticating, based on the IoT device private key ($K_{IoT}$) and the authentication request, the user device to obtain the user public key ($P_u$) further comprises:

calculating, based on the IoT device private key ($K_{IoT}$) and the first encrypted information, the user random number ($R_u$);

calculating, based on the user random number ($R_u$) and the second encrypted information, a user signature of the user device, wherein the user signature is obtained by encrypting the hash value using the user private key ($K_u$); and determining the user public key ($P_u$) based on the user signature and the hash value using an elliptic curve cryptography.

22. The IoT device of paragraph 21, wherein calculating, based on the IoT device private key ($K_{IoT}$) and the first encrypted information, the user random number ($R_u$) comprises: calculating the user random number ($R_u$) according to the following equation:

$$R_u = K^{-1}_{IoT}(P_{IoT}(R_u)),$$

where $P_{IoT}(R_u)$ represents the first encrypted information, and $K^{-1}_{IoT}$ represents a decryption operation using the IoT device private key ($K_{IoT}$); and wherein calculating, based on the user random number ($R_u$) and the second encrypted information, a user signature of the user device comprises: calculating the user signature according to the following equation:

$$K_u(H) = R^{-1}_u(R_u(K_u(H))),$$

where $K_u(H)$ represents the user signature, H represents the hash value of the user data, $R_u(K_u(H))$ represents the second encrypted information, and $R^{-1}_u$ represents a decryption operation using the user random number ($R_u$).

23. The IoT device of paragraph 22, wherein determining whether the user public key ($P_u$) exists in a list of access permitted user devices of the IoT device comprises:

sending the user public key ($P_u$) to a provider of the IoT device, the provider saving a list of access permitted user devices for each IoT device that belongs to the provider; and receiving, from the provider, a search result indicating whether the user public key ($P_u$) exists in the list of access permitted user devices of the IoT device.

24. The IoT device of paragraph 22, wherein determining whether the user public key ($P_u$) exists in a list of access permitted user devices of the IoT device comprises:

determining whether the user public key ($P_u$) exists in the list of access permitted user devices saved by the IoT device.

25. A method for implementing trust Internet of Things (IoT) services based on a block chain, the method being performed by an IoT device configured with a pair of IoT device public key ($P_{IoT}$) and IoT device private key ($K_{IoT}$), the method comprising:

receiving an authentication request from a user device, the user device being configured with a pair of user public key ($P_u$) and user private key ($K_u$), and the authentication request including a hash value of user data of the user device, first encrypted information obtained based on the IoT device public key ($P_{IoT}$) and a user random number ($R_u$) and second encrypted information obtained based on the user private key ($K_u$), the user random number ($R_u$) and the hash value;

authenticating, based on the IoT device private key ($K_{IoT}$) and the authentication request, the user device to obtain the user public key ($P_u$);

determining whether the user public key ($P_u$) exists in a list of access permitted user devices of the IoT device; and in response to determining that the user public key ($P_u$) exists in the list of access permitted user devices of the IoT device, determining that authentication of the user device succeeds.

26. The method according to paragraph 25, wherein authenticating, based on the IoT device private key ($K_{IoT}$) and the authentication request, the user device, to obtain the user public key ($P_u$) further comprises:

calculating, based on the IoT device private key ($K_{IoT}$) and the first encrypted information, the user random number ($R_u$);

calculating, based on the user random number ($R_u$) and the second encrypted information, a user signature of the user device, wherein the user signature is obtained by encrypting the hash value using the user private key ($K_u$); and determining, based on the user signature and the hash value using an elliptic curve cryptography, the user public key ($P_u$).

27. The method of paragraph 26, wherein calculating, based on the IoT device private key ($K_{IoT}$) and the first encrypted information, the user random number ($R_u$) comprises: calculating the user random number ($R_u$) according to the following equation:

$$R_u = K^{-1}{}_{IoT}(P_{IoT}(R_u)),$$

where $P_{IoT}(R_u)$ represents the first encrypted information, and $K^{-1}{}_{IoT}$ represents a decryption operation using the IoT device private key ($K_{IoT}$); and wherein calculating, based on the user random number ($R_u$) and the second encrypted information, a user signature of the user device comprises: calculating the user signature according to the following equation:

$$K_u(H) = R^{-1}{}_u(R_u(K_u(H))),$$

where $K_u(H)$ represents the user signature, H represents the hash value of the user data, $R_u(K_u(H))$ represents the second encrypted information, and $R^{-1}{}_u$ represents a decryption operation using the user random number ($R_u$).

28. The method of paragraph 27, wherein determining whether the user public key ($P_u$) exists in a list of access permitted user devices of the IoT device comprises:

sending the user public key ($P_u$) to a provider of the IoT device, the provider saving a list of access permitted user devices for each IoT device that belongs to the provider; and receiving, from the provider, a search result indicating whether the user public key ($P_u$) exists in the list of access permitted user devices of the IoT device.

29. The method of paragraph 27, wherein determining whether the user public key ($P_u$) exists in a list of access permitted user devices of the IoT device comprises:

determine whether the user public key ($P_u$) exists in the list of access permitted user devices saved by the IoT device.

30. A nonvolatile computer readable storage medium for implementing trusted Internet of Things (IoT) services based on a block chain comprising machine executable instructions that, when executed by a machine, are adapted to cause the machine to implement the method as any of paragraphs 25-29.

31. A user device for implementing trust Internet of Things (IoT) services based on a block chain, the user device being configured with a pair of user public key ($P_u$) and user private key ($K_u$), the user device comprising:

a memory and a processor, the memory being stored with machine executable instructions that, when executed by the processor, cause the user device to perform operations including:

performing a hash operation on user data of the user device to generate a hash value of the user data;

obtaining, based on the IoT device public key ($P_{IoT}$) of the IoT device and a user random number ($R_u$), first encrypted information;

obtaining, based on the user private key ($K_u$), the user random number ($R_u$) and the hash value, second encrypted information; and sending an authentication request to the IoT device, the authentication request including the hash value of the user data, the first encrypted information, and the second encrypted information.

32. The user device of paragraph 31, wherein obtaining, based on the IoT device public key ($P_{IoT}$) of the IoT device and a user random number ($R_u$), first encrypted information comprises: encrypting the user random number ($R_u$) by using the IoT device public key ($P_{IoT}$) to generate the first encrypted information ($P_{IoT}(R_u)$); and wherein obtaining based on the user private key ($K_u$), the user random number ($R_u$), and the hash value, second encrypted information comprises: encrypting the hash value by using the user private key ($K_u$) to generate a user signature ($K_u(H)$) of the user device, wherein H represents the hash value; and encrypting the user signature by using the random number to generate the second encrypted information ($R_u(K_u(H))$).

33. A method for implementing trust Internet of Things (IoT) services based on a block chain, the method being performed by a user device configured with a pair of user public key ($P_u$) and user private key ($K_u$), the method comprising:

performing a hash operation on user data of the user device to generate a hash value of the user data;

obtaining, based on an IoT device public key ($P_{IoT}$) of an IoT device and a user random number ($R_u$), first encrypted information;

obtaining, based on the user private key ($K_u$), the user random number ($R_u$), and the hash value, second encrypted information; and sending an authentication request to the IoT device, the authentication request including the hash value of the user data, the first encrypted information, and the second encrypted information.

34. The method of paragraph 33, wherein obtaining, based on the IoT device public key ($P_{IoT}$) of the IoT device and a user random number ($R_u$), first encrypted information comprises: encrypting the user random number ($R_u$) by using the IoT device public key ($P_{IoT}$) to generate the first encrypted information ($P_{IoT}(R_u)$); and wherein obtaining, based on the user private key ($K_u$), the user random number ($R_u$) and the hash value, second encrypted information comprises: encrypting the hash value by using the user private key ($K_u$) to generate a user signature ($K_u(H)$) of the user device, wherein H represents the hash value; and encrypting the user signature by using the random number to generate the second encrypted information ($R_u(K_u(H))$).

35. A nonvolatile computer readable storage medium for implementing trust Internet of Things (IoT) services based on a block chain comprising machine executable instructions that, when executed by a machine, are adapted to cause the machine to implement the method as any of paragraphs 33-34.

What is claimed is:

1. An Internet of Things (IoT) device for implementing trust IoT services in the IoT device and a user device, the IoT device being configured with a pair of IoT device public key ($P_{IoT}$) and IoT device private key ($K_{IoT}$), the IoT device comprising:

a memory and a processor, the memory being stored with machine executable instructions that, when executed by the processor, cause the IoT device to perform operations including:

receiving an authentication request from the user device, the user device being configured with a pair of user public key ($P_u$) and user private key ($K_u$), and the authentication request including:

a hash value of user data of the user device, first encrypted information obtained based on the IoT device public key ($P_{IoT}$) encrypting a user random number ($R_u$) and second encrypted information obtained based on encrypting the hash value using the user private key ($K_u$) and encrypting the encrypted hash value using the random number ($R_u$);

authenticating, based on the IoT device private key ($K_{IoT}$) and the authentication request, the user device to obtain the user public key ($P_u$);

determining whether the user public key ($P_u$) exists in a list of access permitted user devices of the IoT device; and in response to determining that the user public key ($P_u$) exists in the list of access permitted user devices of the IoT device, determining that authentication of the user device succeeds.

2. The IoT device according to claim 1, wherein authenticating, based on the IoT device private key ($K_{IoT}$) and the authentication request, the user device to obtain the user public key ($P_u$) further comprises:

calculating, based on the IoT device private key ($K_{IoT}$) and the first encrypted information, the user random number ($R_u$);

calculating, based on the user random number ($R_u$) and the second encrypted information, the encrypted hash value; and determining the user public key ($P_u$) based on the encrypted hash value and the hash value using an elliptic curve cryptography.

3. The IoT device of claim 2, wherein calculating, based on the IoT device private key ($K_{IoT}$) and the first encrypted information, the user random number ($R_u$) comprises:

calculating the user random number ($R_u$) according to the following equation:

$$R_u = K^{-1}_{IoT}(P_{IoT}(R_u)),$$

where $P_{IoT}(R_u)$ represents the first encrypted information, and $K^{-1}_{IoT}$ represents a decryption operation using the IoT device private key ($K_{IoT}$); and wherein calculating, based on the user random number ($R_u$) and the second encrypted information, the encrypted hash value comprises: calculating the encrypted hash value according to the following equation:

$$K_u(H) = R^{-1}_u(R_u(K_u(H))),$$

where $K_u(H)$ represents the encrypted hash value, H represents the hash value of the user data, $R_u(K_u(H))$ represents the second encrypted information, and $R^{-1}_u$ represents a decryption operation using the user random number ($R_u$).

4. The IoT device of claim 3, wherein determining whether the user public key ($P_u$) exists in a list of access permitted user devices of the IoT device comprises:

sending the user public key ($P_u$) to a provider of the IoT device, the provider saving a list of access permitted user devices for each IoT device that belongs to the provider; and receiving, from the provider, a search result indicating whether the user public key ($P_u$) exists in the list of access permitted user devices of the IoT device.

5. The IoT device of claim 3, wherein determining whether the user public key ($P_u$) exists in a list of access permitted user devices of the IoT device comprises:

determining whether the user public key ($P_u$) exists in the list of access permitted user devices saved by the IoT device.

6. A user device for implementing trust Internet of Things (IoT) services implemented in the user device and an IoT device, the user device being configured with a pair of user public key ($P_u$) and user private key ($K_u$), the user device comprising:

a memory and a processor, the memory being stored with machine executable instructions that, when executed by the processor, cause the user device to perform operations including:

performing a hash operation on user data of the user device to generate a hash value of the user data;

obtaining, based on an IoT device public key ($P_{IoT}$) of the IoT device encrypting a user random number ($R_u$), first encrypted information;

obtaining, based on encrypting the hash value using the user private key ($K_u$) and encrypting the encrypted hash value using the random number ($R_u$), second encrypted information; and sending an authentication request to the IoT device, the authentication request including the hash value of the user data, the first encrypted information, and the second encrypted information;

the user device is authenticated in response to the IoT device performing operations including:

authenticating, based on an IoT device private key ($K_{IoT}$) and the authentication request, the user device to obtain the user public key ($P_u$);

determining whether the user public key ($P_u$) exists in a list of access permitted user devices of the IoT device; and in response to determining that the user public key ($P_u$) exists in the list of access permitted user devices of the IoT device, determining that authentication of the user device succeeds.

7. A method for implementing trust Internet of Things (IoT) services in an IoT device and a user device, the method being performed by the IoT device configured with a pair of IoT device public key ($P_{IoT}$) and IoT device private key ($K_{IoT}$), the method comprising:

receiving an authentication request from the user device, the user device being configured with a pair of user public key ($P_u$) and user private key ($K_u$), and the authentication request including:

a hash value of user data of the user device, first encrypted information obtained based on the IoT device public key ($P_{IoT}$) encrypting a user random number ($R_u$) and second encrypted information obtained based on encrypting the hash value using the user private key ($K_u$) and encrypting the encrypted hash value using the random number ($R_u$);

authenticating, based on the IoT device private key ($K_{IoT}$) and the authentication request, the user device to obtain the user public key ($P_u$);

determining whether the user public key ($P_u$) exists in a list of access permitted user devices of the IoT device; and in response to determining that the user public key ($P_u$) exists in the list of access permitted user devices of the IoT device, determining that authentication of the user device succeeds.

8. The method according to claim 7, wherein authenticating, based on the IoT device private key ($K_{IoT}$) and the authentication request, the user device, to obtain the user public key ($P_u$) further comprises:
calculating, based on the IoT device private key ($K_{IoT}$) and the first encrypted information, the user random number ($R_u$);
calculating, based on the user random number ($R_u$) and the second encrypted information, the encrypted hash value; and
determining, based on the encrypted hash value and the hash value using an elliptic curve cryptography, the user public key ($P_u$).

9. The method of claim 8, wherein calculating, based on the IoT device private key ($K_{IoT}$) and the first encrypted information, the user random number ($R_u$) comprises:
calculating the user random number ($R_u$) according to the following equation:

$$R_u = K^{-1}_{IoT}(P_{IoT}(R_u)),$$

where $P_{IoT}(R_u)$ represents the first encrypted information, and $K^{-1}_{IoT}$ represents a decryption operation using the IoT device private key ($K_{IoT}$); and
wherein calculating, based on the user random number ($R_u$) and the second encrypted information, the encrypted hash value comprises:
calculating the encrypted hash value according to the following equation:

$$K_u(H) = R^{-1}_u(R_u(K_u(H))),$$

where $K_u(H)$ represents the encrypted hash value, H represents the hash value of the user data, $R_u(K_u(H))$ represents the second encrypted information, and $R^{-1}_u$ represents a decryption operation using the user random number ($R_u$).

10. The method of claim 9, wherein determining whether the user public key ($P_u$) exists in a list of access permitted user devices of the IoT device comprises:
sending the user public key ($P_u$) to a provider of the IoT device, the provider saving a list of access permitted user devices for each IoT device that belongs to the provider; and
receiving, from the provider, a search result indicating whether the user public key ($P_u$) exists in the list of access permitted user devices of the IoT device.

11. The method of claim 9, wherein determining whether the user public key ($P_u$) exists in a list of access permitted user devices of the IoT device comprises:
determine whether the user public key ($P_u$) exists in the list of access permitted user devices saved by the IoT device.

12. A non-transitory computer readable storage medium for implementing trusted Internet of Things (IoT) services in an IoT device and a user device comprising machine executable instructions that, when executed by a machine, are adapted to cause the machine to implement a method performed by the IoT device,
where the IoT device is configured with a pair of IoT device public key ($P_{IoT}$) and IoT device private key ($K_{IoT}$), the method comprising:
receiving an authentication request from the user device, the user device being configured with a pair of user public key ($P_u$) and user private key ($K_u$), and the authentication request including:
a hash value of user data of the user device,
first encrypted information obtained based on the IoT device public key ($P_{IoT}$) encrypting a user random number ($R_u$) and
second encrypted information obtained based on encrypting the hash value using the user private key ($K_u$) and encrypting the encrypted hash value using the random number ($R_u$);
authenticating, based on the IoT device private key ($K_{IoT}$) and the authentication request, the user device to obtain the user public key ($P_u$);
determining whether the user public key ($P_u$) exists in a list of access permitted user devices of the IoT device; and
in response to determining that the user public key ($P_u$) exists in the list of access permitted user devices of the IoT device, determining that authentication of the user device succeeds.

* * * * *